(12) United States Patent
Brown et al.

(10) Patent No.: US 8,333,117 B2
(45) Date of Patent: Dec. 18, 2012

(54) ISOLATION ELEMENTS INCLUDING ONE OR MORE DIAPHRAGMS, SENSORS INCLUDING ISOLATION ELEMENTS, AND RELATED METHODS

(75) Inventors: Scott J. Brown, Riverton, UT (US); Diana R. Clark, Midvale, UT (US); K. Robert Harker, West Jordan, UT (US); Lon J. Perry, South Jordan, UT (US)

(73) Assignee: Quartzdyne, Inc., Salt Lake City, UT (US)

( * ) Notice: Subject to any disclaimer, the term of this patent is extended or adjusted under 35 U.S.C. 154(b) by 0 days.

(21) Appl. No.: 13/023,339

(22) Filed: Feb. 8, 2011

(65) Prior Publication Data

US 2012/0198939 A1 Aug. 9, 2012

(51) Int. Cl.
*G01L 7/00* (2006.01)
(52) U.S. Cl. .......................................... 73/706
(58) Field of Classification Search ............. 73/700–756
See application file for complete search history.

(56) References Cited

U.S. PATENT DOCUMENTS

| | | | |
|---|---|---|---|
| 3,561,832 A | 2/1971 | Karrer et al. | |
| 3,617,780 A | 11/1971 | Benjaminson | |
| 3,645,137 A | 2/1972 | Hazen | |
| 4,550,610 A | 11/1985 | EerNisse | |
| 4,660,420 A | 4/1987 | Eer Nisse | |
| 4,798,089 A * | 1/1989 | Frick et al. | 73/706 |
| 4,875,368 A | 10/1989 | Delatorre | |
| 5,184,514 A * | 2/1993 | Cucci et al. | 73/706 |
| 5,230,248 A * | 7/1993 | Cucci et al. | 73/706 |
| 5,337,612 A | 8/1994 | Evans | |
| 6,209,399 B1 * | 4/2001 | Probst et al. | 73/756 |
| 6,282,966 B1 * | 9/2001 | Probst et al. | 73/715 |
| 2010/0180688 A1 * | 7/2010 | Khemet et al. | 73/727 |

* cited by examiner

*Primary Examiner* — Andre Allen
(74) *Attorney, Agent, or Firm* — TraskBritt (57) ABSTRACT

Isolation elements comprise a housing comprising a longitudinal bore formed therein and at least one recess formed in at least one longitudinally extending side of the housing. The at least one recess is in communication with the longitudinal bore. At least one diaphragm is attached proximate a periphery thereof to the housing and seals the at least one recess at the at least one longitudinally extending side of the housing. Sensor assemblies may include an isolation element including a housing and a diaphragm coupled thereto. Methods of forming an isolation element for use with a sensor comprise forming a longitudinal bore in a housing; forming at least one recess in at least one longitudinally extending side of the housing; coupling at least one diaphragm to the housing; and positioning the at least one diaphragm such that a primary direction of displacement of the at least one diaphragm extends into the at least one recess.

21 Claims, 8 Drawing Sheets

ISOLATION ELEMENTS INCLUDING ONE OR MORE DIAPHRAGMS, SENSORS INCLUDING ISOLATION ELEMENTS, AND RELATED METHODS

FIELD

Embodiments of the present disclosure relate to apparatus and methods for isolating a sensor from a working environment and, more particularly, to isolation elements having diaphragms attached to one or more corresponding recesses formed in longitudinally extending sides of the isolation elements, as well as to methods of forming such isolation elements and sensor assemblies including such elements.

BACKGROUND

Sensors for sensing pressure and/or temperature, sometimes interchangeably called transducers, have been used successfully in the downhole environment of oil and gas wells for several decades, and are still conventional means for determining downhole pressures, such as, for example, bottom-hole pressure and annulus pressure. For example, quartz pressure sensors may be used to determine downhole pressure. Conventionally, an isolation element and an isolation fluid are disposed between a working environment that is being monitored for temperature and pressure changes and the sensing element of the transducer is used to conduct the measurements. Known isolation elements may include diaphragms, bladders, and bellows, and a variety of fluids that have been employed as isolation fluids including various hydrocarbon liquids.

Sensor isolation schemes should protect the sensing element from the fluid environment being measured and enable accurate, responsive, and repeatable measurements by the sensing element when in use. Although somewhat self-evident, an isolation element itself, and its connection to the sensor or housing in which the sensor is placed, should be substantially immune to any hostile characteristics of the fluid environment. Areas of potential application for such an isolation element include, for example, petroleum applications (e.g., drilling, exploration, production, completions, logging, etc.), aerospace applications, purified liquid and gas handling, medical applications, and petrochemical and other industrial processes.

When deployed in an earth-boring application, clearances in drill pipe and tubing, added to wall thicknesses necessary for housings capable of protecting electronic instrumentation to pressures that may exceed 20,000 psi (approximately 137.8 MPa), generally limit sensor size to an overall diameter not exceeding 1 inch (25.4 millimeters). Further, due to the desirability of frictionless operation of an isolation element, which will enable consistent performance characteristics of the sensor, the size and mass of the isolation element should be minimized to mitigate orientation sensitivity due to gravity, particularly in highly deviated and horizontal wells. In addition, the larger the fluid volume and more compressible the isolation fluid, the more stroke or travel is required of the isolation element for a given sensor response. Likewise, fluctuations in environmental temperature may cause the isolation fluid to expand and contract, further adding to the potential stroke or travel required of the isolation element. The trade-off between volume, compressibility, and travel may result, in some configurations, in preventing the external pressure and thermal expansion from being transmitted completely and accurately to the sensing element.

Many environments, for reasons of corrosive effects and conductivity, should be kept from contacting the sensing element itself. Examples of such hostile environments include hydrogen sulfide, carbon dioxide, oxygen, water, and various solvents, some of which readily permeate thin membranes of known elastomers and also attack many common metals.

Even with the use of corrosion-resistant materials, serviceability of the isolation element may be desirable so that it can be cleaned and replaced if necessary, as even corrosion-resistant metals, particularly if of thin wall cross-section, deteriorate over time when subjected to highly corrosive fluids (e.g., liquids, gases, and combinations of liquids and gases). Elevated temperatures, such as those present in wellbores and in many industrial processes, may accelerate deterioration. In addition to corrosion-induced deterioration, most isolation schemes are subject to performance degradation due to particulate contamination, usually from debris, detritus, or contaminants present in the environmental fluid. Particulate contamination that interferes with the active or movable part of the isolation element poses the threat of increased friction and interference with travel, which reduce repeatability, reduce the accuracy of measurements, and even render the isolation element inoperative.

In summary, it is desirable that a sensor isolation element be constructed of a rugged, corrosion-resistant material, promote serviceability, replaceability, and ease of assembly and reassembly, and enable a consistent result in terms of performance.

One commonly employed isolation element comprises a bellows, examples of which are disclosed in U.S. Pat. Nos. 4,875,368 and 5,337,612. For example, a bellows may be placed on an end of a cylindrical sensor housing and exposed to environmental fluid, such as a working fluid in a downhole earth-boring environment. As the bellows expands and contracts in an axial direction in response to environmental pressure and/or temperature, the pressure and thermal expansion may be transmitted by an isolation fluid through internal fluid communication channels to a pressure sensor. The sensor may transmit electrical signals in response to the pressure and thermal expansion, which may be interpreted to determine environmental pressure. Debris, detritus, and contaminants present in the environmental fluid may, however, become lodged in the bellows, or otherwise interfere with bellows operation, compromising the accuracy and precision of pressure measurements. Wax and hydrates may also form on the bellows and interfere with the operation of the bellows. Moreover, the bellows may reach full compression at a pressure below the environmental pressure, preventing the sensor from measuring higher pressures. This is especially prevalent in applications where a large volume of isolation fluid must expand or contract in response to changing pressures and temperatures to give a reliable pressure measurement.

BRIEF SUMMARY

In some embodiments, the present disclosure includes isolation elements comprising a housing including a longitudinal bore formed therein and at least one recess formed in at least one longitudinally extending side of the housing. The at least one recess is in communication with the longitudinal bore. At least one diaphragm is attached to the housing proximate a periphery of the at least one recess and seals the at least one recess and the longitudinal bore from an environment exterior to the housing.

In further embodiments, the present disclosure includes sensor assemblies comprising an isolation element. The isolation element comprises a housing. The housing comprises a connection portion, a longitudinal bore formed within the housing and extending through the connection portion, at least one recess formed in a side of the housing in communication with the longitudinal bore, and at least one diaphragm coupled at a periphery thereof to the housing over the at least one recess and sealing the at least one recess at the side of the housing. A sensor housing is attached to the isolation element at the connection portion. The sensor housing comprises a sensor chamber disposed within and defined by the sensor housing. The sensor chamber is in communication with the longitudinal bore of the isolation element. At least one sensor is disposed within the sensor chamber.

Further embodiments of the present disclosure include methods of forming an isolation element for use with a sensor, comprising forming a longitudinal bore in a housing of an isolation element; forming at least one recess in at least one longitudinally extending side of the housing in communication with the longitudinal bore; coupling at least one diaphragm to the housing at a perimeter of the at least one recess; and positioning the at least one diaphragm such that a primary direction of displacement of the at least one diaphragm extends into the at least one recess.

DETAILED DESCRIPTION

In the following detailed description, reference is made to the accompanying drawings that depict, by way of illustration, specific embodiments in which the present disclosure may be practiced. However, other embodiments may be utilized, and structural, logical, and configurational changes may be made without departing from the scope of the present disclosure. The illustrations presented herein are not meant to be actual views of any particular isolation element or sensor, but are merely idealized representations that are employed to describe embodiments of the present disclosure. The drawings presented herein are not necessarily drawn to scale. Additionally, elements common between drawings may retain the same numerical designation.

Figure 1:
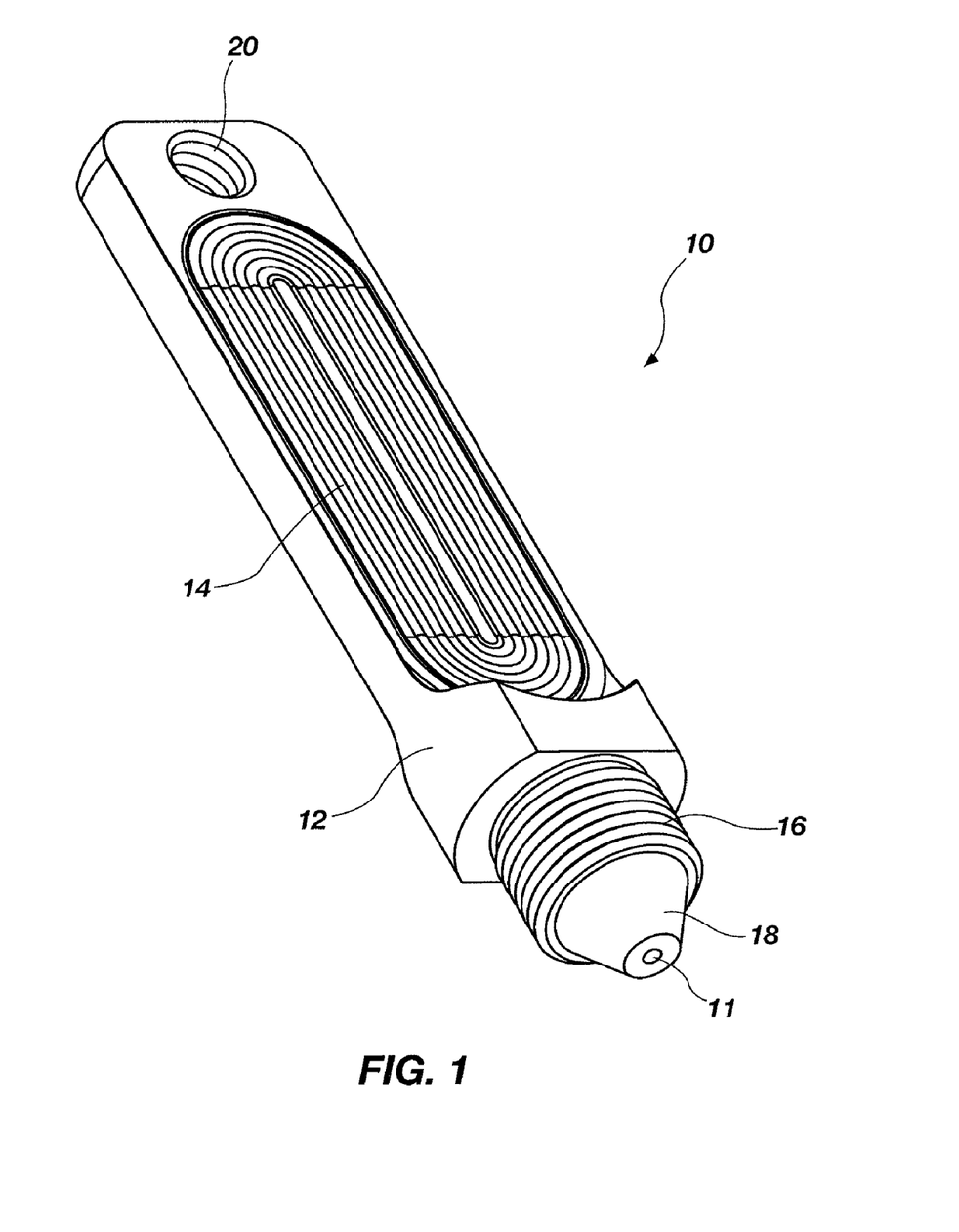
FIG. 1 is a perspective view of an isolation element according to an embodiment of the present disclosure.

FIG. 1 is a perspective view of an isolation element 10 according to an embodiment of the present disclosure. The isolation element 10 includes a housing 12 and one or more diaphragms 14 attached to a portion of the housing 12 (e.g., sides 13, 15 (FIG. 3) of the housing 12). For example, the isolation element 10 may include a single diaphragm attached to a portion of the housing 12. The embodiment shown in FIG. 1 includes two diaphragms 14 on attached to portions of the housing 12 on opposing sides of the housing 12 (best shown in FIG. 3). In other embodiments, it is contemplated that additional diaphragms may be attached to portions of the housing 12. The housing 12 also includes a connection portion (e.g., a threaded connection portion 16) at an end (e.g., a proximal end) of the housing 12. The threaded connection portion 16 may include a sealing element 18 extending therefrom at the proximal end of the housing 12 to enable sealing engagement of the isolation element 10 to an associated structure (e.g., a sensor for measuring pressure, temperature, or combinations thereof). An opening 11 may be formed in the threaded connection portion 16 enabling fluid communication between the interior of the isolation element 10 and the sensor. In some embodiments, the housing 12 may include a securing element at an end of the housing 12 (e.g., a distal end opposing the threaded connection portion 16 at the proximal end of the housing 12). For example, a threaded securing hole 20 may be formed in the housing 12. In additional embodiments, the housing 12 may include an O-ring groove at an end of the housing 12 for use as a sealing mechanism.

Figure 2:
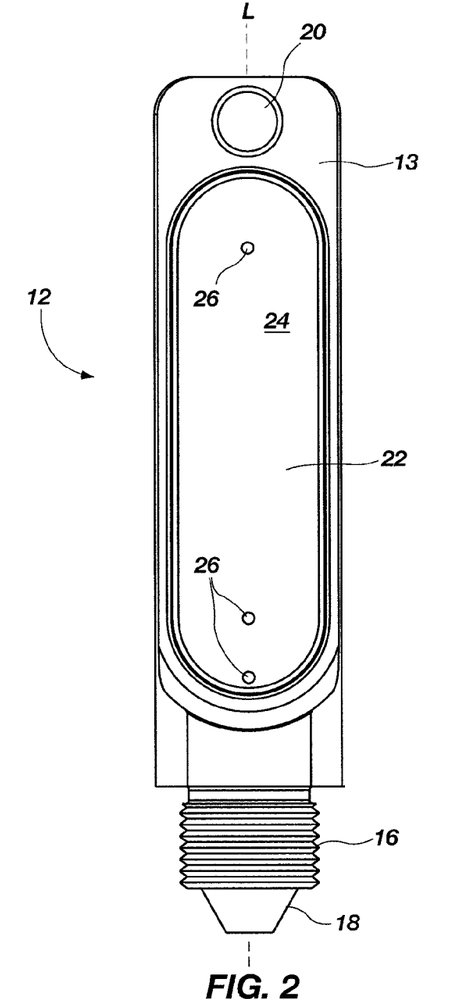
FIG. 2 is a front view of a housing of the isolation element of FIG. 1.
Figure 3:
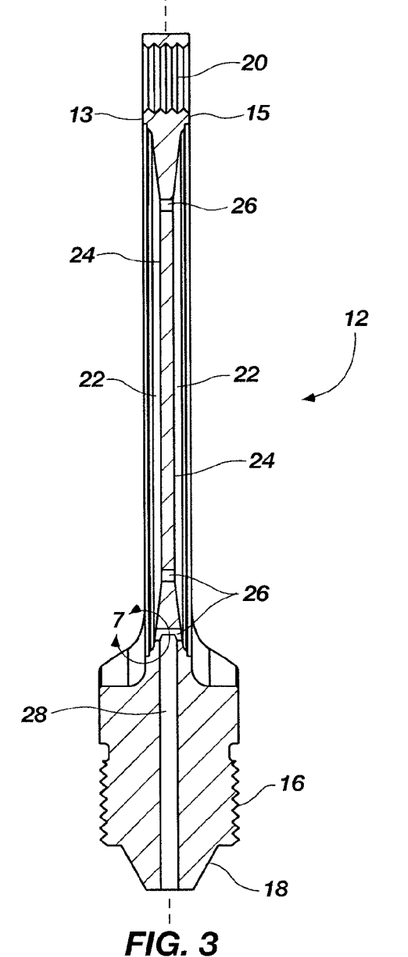
FIG. 3 is a cross-sectional side view of the housing of FIG. 2.

FIG. 2 is a front view of the housing 12 of the isolation element 10 shown in FIG. 1. The housing 12 includes a longitudinal axis L extending along the length thereof and one or more recesses 22 formed in sides 13, 15 (FIG. 3) of the housing 12. For example, the housing 12 may include a first side 13 having a recess 22 formed therein and a second side 15 (FIG. 3) having another recess 22 formed therein. In some embodiments, and as shown in FIG. 3, the sides 13, 15 may be longitudinally extending sides of the housing 12 in opposition to one another. In other words, the sides 13, 15 may extend in a direction substantially parallel to the longitudinal axis L of the housing 12. Referring back to FIG. 2, the recess 22 shown in FIG. 2 may have a shape, which may be described as a "racetrack" or "obround" shape resembling a rectangle having two semicircles at opposing ends of the rectangle. In other embodiments, the recess 22 may have a shape, which may be described as a circle, an ellipse, an oval, a rectangle, or a rectangle with rounded corners. The bottom surface of the recesses 22 may be defined by a surface, which may be described as a backing plate 24. The backing plate 24 may have one or more holes 26 formed therein and extending through a portion of the housing 12. For example, the recess 22 shown in FIG. 2 includes a plurality of holes 26 formed through the backing plate 24 of the recess 22. The holes 26 may enable a recess 22 on one longitudinally extending side 13 of the housing 12 to be in communication with a recess 22 on an opposing longitudinally extending side 15 (FIG. 3) of the housing 12. In some embodiments, the backing plate 24 may have an at least partially concave surface to enable operation of one or more diaphragms 14 (FIG. 5) as discussed below in further detail. It is noted that while the embodiment shown and described with reference to FIGS. 2 and 3 illustrates a housing 12 having two opposing, longitudinally extending sides 13, 15, in other embodiments the housing 12 may include more than two longitudinally extending sides. For example, a housing may exhibit a substantially triangular lateral cross section, a substantially quadrilateral (e.g., square, rectangular) lateral cross section or any other suitable shape (e.g., other polygonal cross-sectional shapes, a circular or arced cross-sectional shapes, etc.).

FIG. 3 is a cross-sectional view of the housing 12 shown in FIG. 2. The housing 12 includes a longitudinal bore 28 extending, for example, along a portion of the longitudinal axis L. The longitudinal bore 28 may be formed in a portion of housing 12 and extend to the recesses 22. For example, the longitudinal bore 28 may be formed through the sealing element 18 and the threaded connection portion 16 at the proximal end of the housing 12. The longitudinal bore 28 may extend to the recesses 22 and may be in communication with one or more of the holes 26. For example, as shown in FIG. 3, the longitudinal bore 28 is in communication with one of the three holes 26 formed through the backing plates 24 of each recess 22. Accordingly, the recesses 22 are in communication with one another and with the longitudinal bore 28 via the holes 26. In some embodiments and as shown in FIG. 3, the longitudinal bore 28 may extend through the housing 12 along a portion (e.g., an edge portion) of the recesses 22. In other embodiments, such as that shown in FIG. 10, a longitudinal bore 28' may extend through the housing 12' along an entirety of one or more of the recesses 22'. In addition, the recesses 22' comprise a hole extending longitudinally along the backing plate 24' and in fluid communication with the longitudinal bore 28'.

Figure 4:
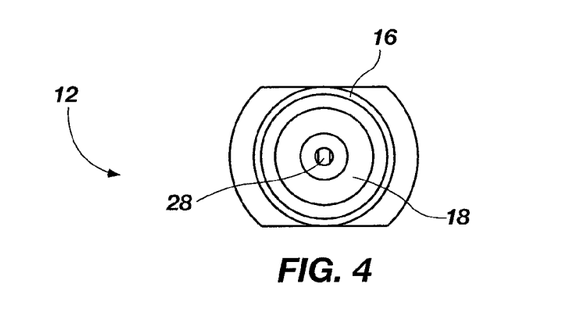
FIG. 4 is a bottom view of the housing of FIG. 2.

FIG. 4 is a bottom view of the housing of FIG. 2, and further depicts the longitudinal bore 28, the sealing element 18, and the threaded connection portion 16.

As shown in FIG. 3, the thickness and configuration of the housing 12 may vary along the longitudinal length of the housing 12. For example, the proximal end of the housing 12 comprising the threaded connection portion 16 and the sealing element 18 may comprise a substantially cylindrical end having threads formed in the threaded connection portion 16 and a frustoconical shape at the sealing element 18. The middle portion of the housing 12 including the recesses 22 and the distal end portion including the threaded securing hole 20 may comprise an elongate member that is wider in one direction (e.g., a side of the housing 12 having the recesses 22 formed therein), as shown in FIG. 2, than it is in another direction, as shown in FIG. 3. In other words, the housing 12 may be said to resemble a diving board in shape. In other embodiments, the housing 12 may include four sides that may exhibit a substantially equal width. For example, the housing may have a substantially square cross-section and may include one or more recesses in one or more (e.g., each) of the sides of the housing.

In some embodiments, the housing 12 may comprise a plurality of recesses 22. For example, the housing 12 shown in FIGS. 2 and 3 comprises one recess 22 in each of two opposing sides 13, 15 of the housing 12. In other embodiments, only one recess 22 may be formed in one side of the housing 12. In further embodiments, at least two recesses 22 may be formed in each side of the housing 12, which comprises recesses 22, whether it be one side or two opposing sides (e.g., isolation element 10' (FIG. 8), discussed below).

In some embodiments, the housing 12 may comprise a material that is rugged and corrosion-resistant (e.g., a material suitable for use in a high-pressure, high-temperature, corrosive, and abrasive environment or environment fluid, such as in a downhole earth-boring application). For example, the housing 12 may comprise steel, stainless steel, nickel, chromium, molybdenum, aluminum, titanium, copper, alloys thereof, a cermet, such as tungsten carbide, or any combination of the foregoing materials. As a specific non-limiting example, the housing 12 may comprise INCONEL® 625 alloy steel.

Figure 5:
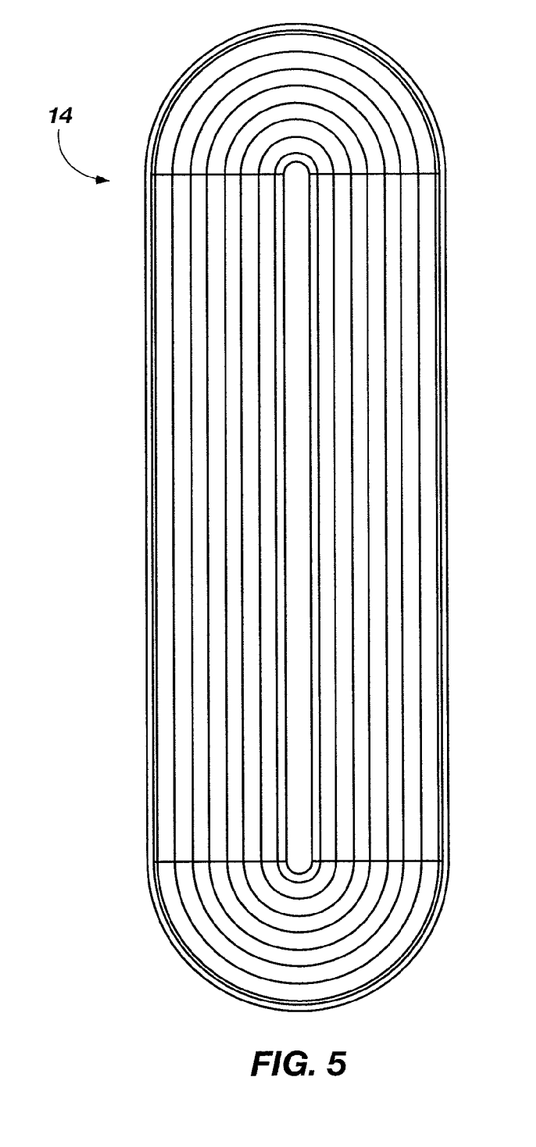
FIG. 5 is a front view of a diaphragm of the isolation element of FIG. 1.
Figure 6:
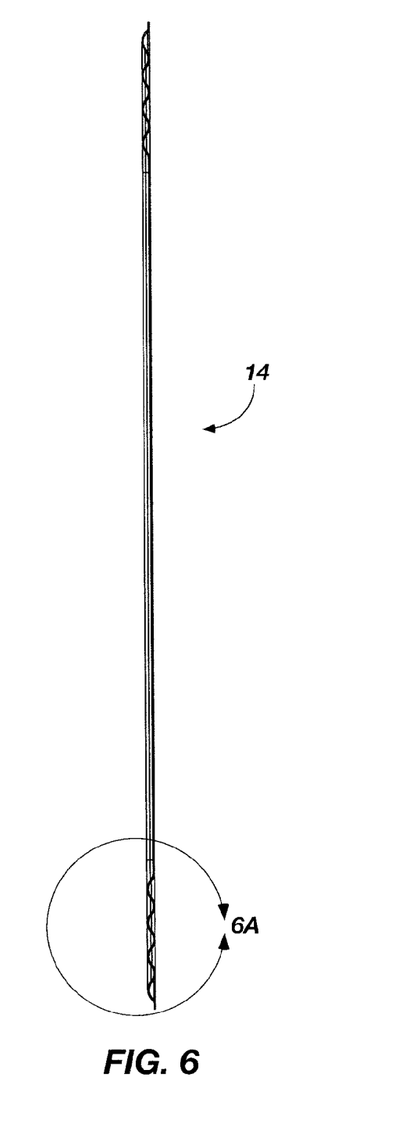
FIG. 6 is a cross-sectional side view of the diaphragm of FIG. 5.
Figure 6A:
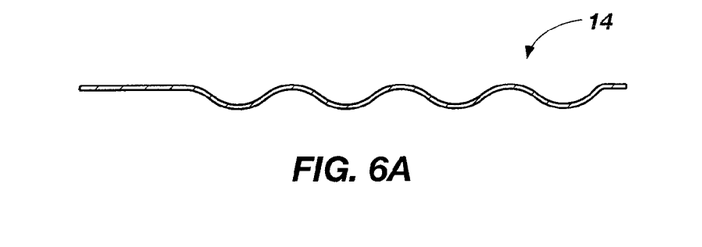
FIG. 6A is an enlarged partial cross-sectional side view of a portion of the diaphragm of FIG. 5.

FIG. 5 is a front view of the diaphragm 14 of the isolation element 10 shown in FIG. 1. FIG. 6 is a cross-sectional side view of the diaphragm 14 shown in FIG. 5. FIG. 6A is an enlarged partial cross-sectional view of the circled portion 6A of the diaphragm 14 shown in FIG. 6. Taken together, FIGS. 5 through 6A show an elongate diaphragm 14 for attachment at the perimeter of a recess 22 (FIGS. 2 and 3) formed in the housing 12 of the isolation element 10. The diaphragm 14 comprises a shape that is complementary to the recess 22 to which the diaphragm 14 is to be attached. Specifically, the diaphragm 14 shown in FIG. 5 comprises a shape that may be described "obround," resembling a rectangle having two semicircles at opposing ends of the rectangle. In other embodiments, the diaphragm 14 may have a shape that may be described as a circle, an ellipse, an oval, a rectangle, or a rectangle with rounded corners.

In some embodiments, the diaphragm 14 may comprise a corrugated member. For example, as best shown in FIG. 6A, the diaphragm 14 may comprise a series of alternating ridges and grooves that enable the diaphragm 14 to comply, expand, and compress in response to an applied pressure and/or temperature.

Like the housing 12, to which it is to be attached, the diaphragm 14 may comprise a material that is rugged and corrosion-resistant (e.g., a material suitable for use in a high-pressure, high-temperature, corrosive, and abrasive environment or environment fluid, such as in a downhole earth-boring application). For example, the diaphragm 14 may comprise steel, stainless steel, nickel, chromium, molybdenum, aluminum, titanium, copper, alloys thereof, or any combination of the foregoing materials. As a specific non-limiting example, the diaphragm 14 may comprise INCONEL® 625 alloy steel.

Figure 7:
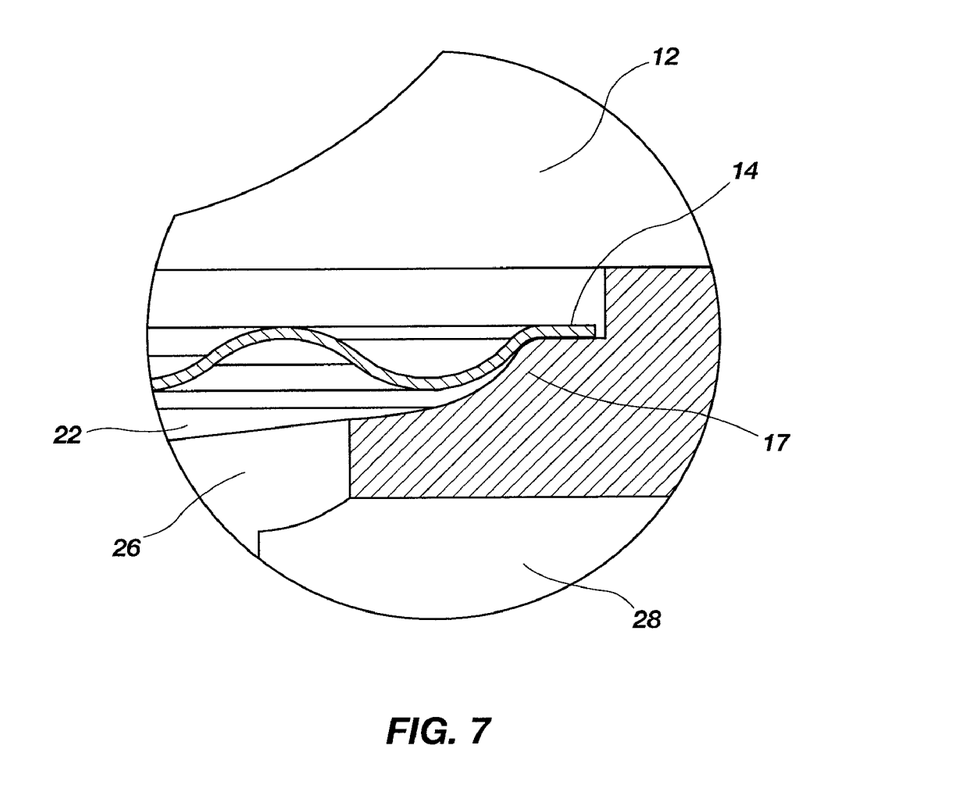
FIG. 7 is an enlarged partial cross-sectional side view of a portion of the isolation element of FIG. 1.

Referring back to FIG. 1, diaphragms 14 may be attached to the housing 12 at the perimeter of the recesses 22 formed in the housing 12. FIG. 7 is an enlarged partial cross-sectional side view of a portion of the isolation element 10. As shown in FIG. 7, the housing 12 may include a portion (e.g., shelf 17) formed on or in a portion of the housing 12 (e.g., in the recess 22). A perimeter portion of the diaphragm 14 may be attached (e.g., welded, brazed, adhered, etc.) to a perimeter of the recess 22 formed by the housing 12 at the shelf 17. As further shown in FIG. 7, in some embodiments, the shelf 17 may be formed at least partially in the recess 22 such that when the diaphragm 14 is attached thereto, the diaphragm 14 is also at least partially recessed within the housing 12 (e.g., recessed with respect to an outer surface of the housing 12 adjacent the recess 22). In some embodiments, the profile of the recess 22 adjacent the shelf 17 may be curved to accommodate the diaphragm 14 (e.g., a portion of the corrugation of the diaphragm 14) therein and enable the diaphragm 14 to translate in response to pressure changes.

In some embodiments, one or more diaphragms 14 may undergo surface preparation before attachment to the housing 12. For example, the outer perimeter of each diaphragm 14 may be sanded before attachment to the housing 12. After sanding, each diaphragm 14 may be positioned proximate a recess 22 formed in the housing 12. The perimeter of each diaphragm 14 may at least substantially align with the perimeter of a recess 22 in the housing 12. When diaphragm 14 and recess 22 perimeters are aligned, each diaphragm 14 may be temporarily affixed to the housing 12 at the perimeter of a recess 22. For example, each diaphragm 14 may be tacked to the housing 12 at points around the perimeter of each recess 22 using a welding process, such as a gas metal arc welding process or, more specifically, a tungsten inert gas (TIG) welding process. In some embodiments, to aid in alignment, in positioning the tack welds, and in dissipating heat generated during the welding process, a metal template (e.g., heat sink) member having holes drilled therethrough at positions where tack welds are desirable may be provided. Each diaphragm 14 may then be permanently attached to the housing 12 at the perimeter of each recess 22 to form a hermetic seal between each diaphragm 14 and the housing 12. For example, each diaphragm 14 may be welded to the housing 12 around the perimeter of each recess 22 using a welding process, such as an electron beam welding process.

Figure 8:
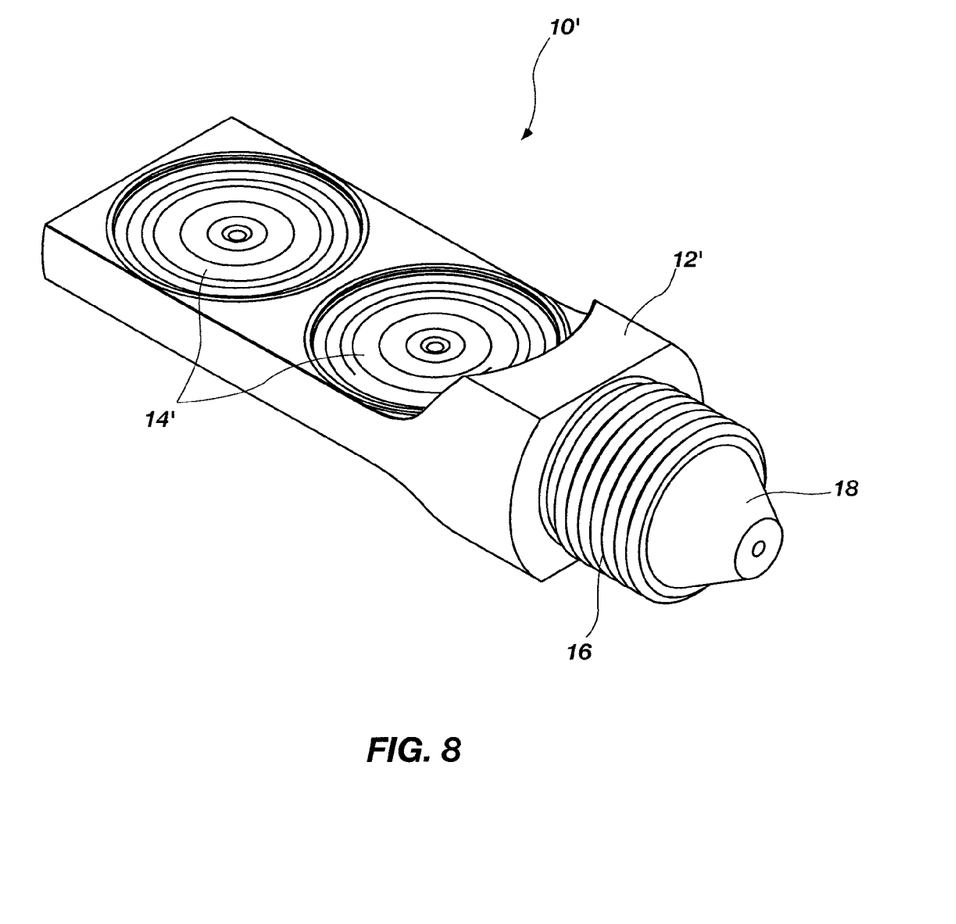
FIG. 8 is a perspective view of an isolation element according to another embodiment of the present disclosure.

FIG. 8 is a perspective view of an isolation element 10', according to another embodiment of the present disclosure. In some embodiments, the isolation element 10' may be somewhat similar to and include features similar to the isolation element 10 (FIG. 1) illustrated and described above. The isolation element 10' comprises a housing 12' and a plurality of diaphragms 14' attached each of two opposing sides 13', 15' (FIG. 10) of the housing 12'. The housing 12' also includes a threaded connection portion 16 at the proximal end of the housing 12', the threaded connection portion 16 having a sealing element 18 extending therefrom.

Figure 9:
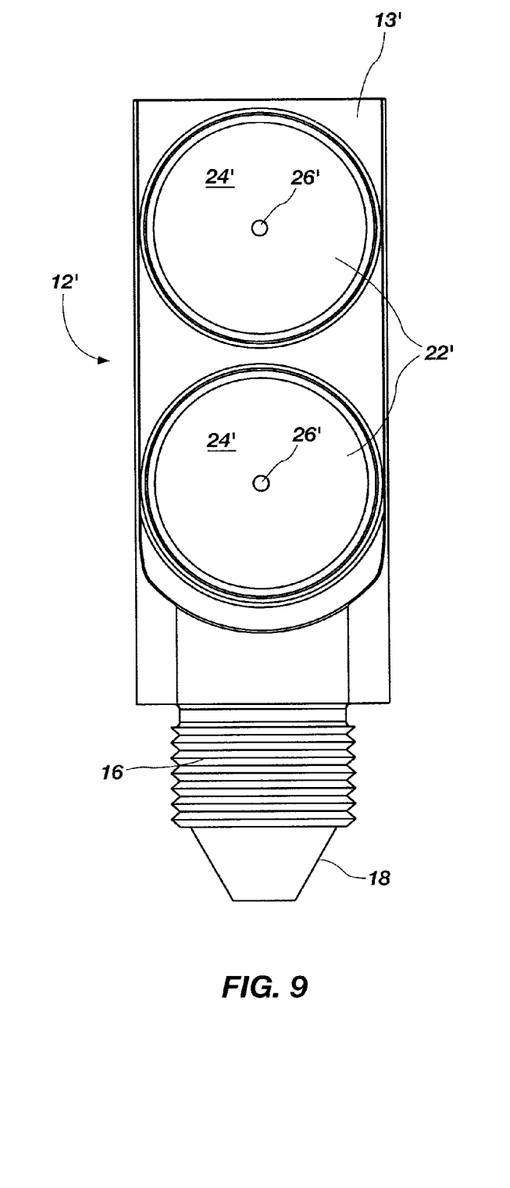
FIG. 9 is a front view of a housing of the isolation element of FIG. 8.
Figure 10:
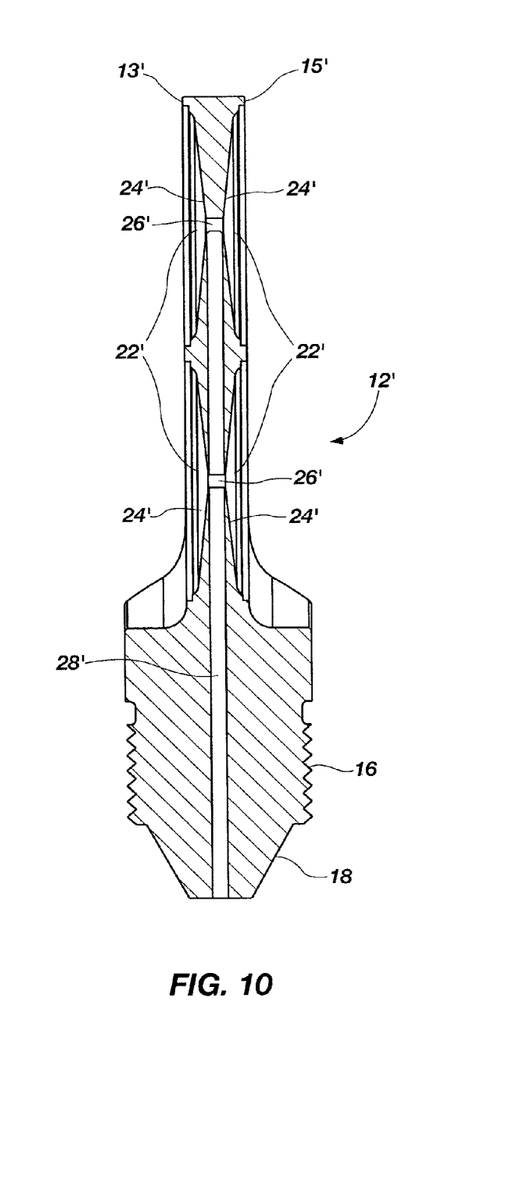
FIG. 10 is a cross-sectional side view of the housing of FIG. 9.

FIG. 9 is a front view of a housing 12' of the isolation element 10' of FIG. 8, and FIG. 10 is a cross-sectional view of the housing 12' of FIG. 9. The housing 12' includes a plurality of recesses 22' formed in opposing longitudinally extending sides 13', 15' (FIG. 10) of the housing 12'. The recesses 22' shown in FIG. 9 have a circular shape. As previously noted, the recess 22' in other embodiments may have a shape that may be described as "obround," an ellipse, an oval, a rectangle, or a rectangle with rounded corners. The bottom surface of each recess 22' may be defined by a backing plate 24' having one or more holes 26' formed in the backing plate 24' and extending through the housing 12'. For example, each recess 22' shown in FIG. 9 includes a single hole 26' formed through the backing plate 24' of each recess 22'. The holes 26' may enable recesses 22' on one longitudinally extending side 13' of the housing 12' to be in communication with recesses 22' on an opposing longitudinally extending side 15' (FIG. 10) of the housing 12'.

As best shown in FIG. 10, the housing 12' further includes a longitudinal bore 28'. The longitudinal bore 28' is formed through the sealing element 18 and the threaded connection portion 16. Further, the longitudinal bore 28' is in communication with at least one hole 26'. The longitudinal bore 28', shown in FIG. 10, is in communication with each of the two holes 26' formed in the backing plates 24' of the recesses 22'. Accordingly, the recesses 22' are in communication with one another and with the longitudinal bore 28' via the holes 26'. In some embodiments, the holes 26' through the backing plate 24' of each recess 22' may be formed by the longitudinal bore 28' as it extends through the housing 12' and intersects the recesses 22'.

Like the embodiment shown in FIGS. 2 through 4, the thickness of the housing 12' shown in FIGS. 9 and 10 may vary along the longitudinal length of the housing 12'.

In some embodiments, the housing 12' may comprise a plurality of recesses 22'. For example, the housing 12' shown in FIGS. 9 and 10 comprises two recesses 22' in each of two opposing sides 13', 15' of the housing 12'. In other embodiments, recesses 22' may only be formed in one side 13' of the housing 12'.

In some embodiments, the housing 12' may comprise a material that is rugged and corrosion-resistant, such as any of the materials discussed previously in relation to the embodiment shown in FIGS. 2 through 4.

Figure 11:
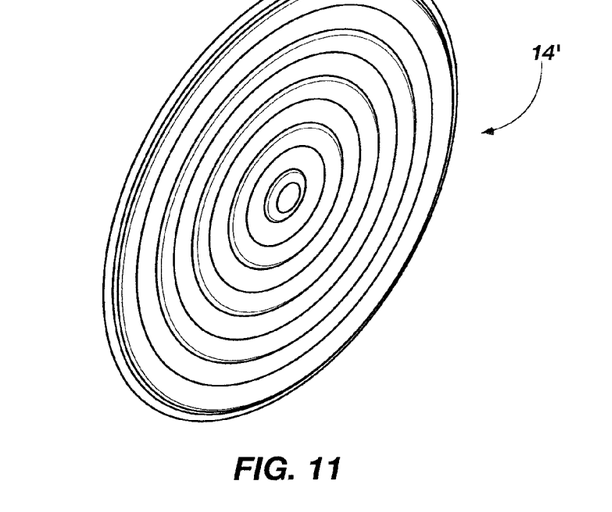
FIG. 11 is a perspective view of a diaphragm of the isolation element of FIG. 8.
Figure 12:
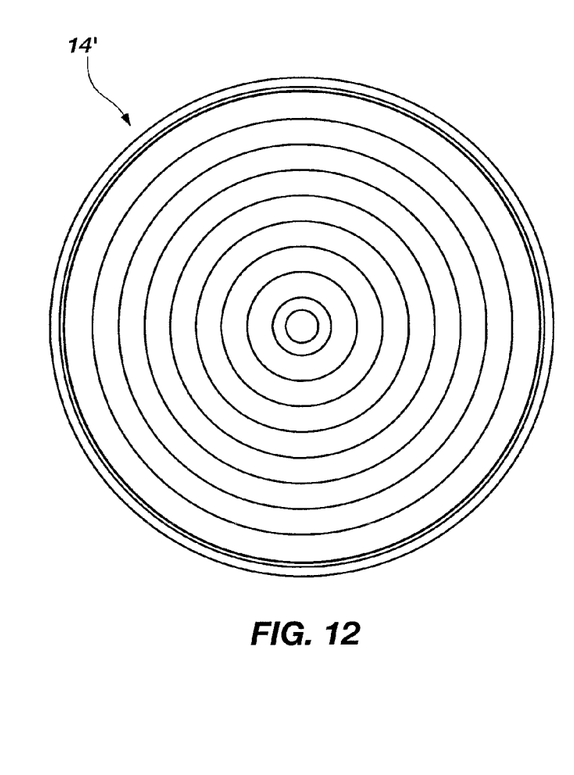
FIG. 12 is a front view of the diaphragm of FIG. 11.
Figure 13:
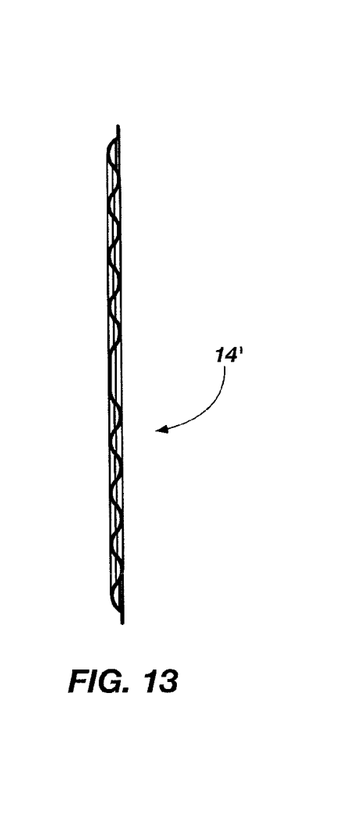
FIG. 13 is a cross-sectional side view of the diaphragm of FIG. 11.

FIG. 11 is a perspective view of a diaphragm 14' of the isolation element 10' of FIG. 8. FIG. 12 is a front view of the diaphragm of FIG. 11. FIG. 13 is a cross-sectional view of the diaphragm of FIG. 11. Taken together, FIGS. 11 through 13 show a diaphragm 14' for attachment at the perimeter of each recess 22' (FIGS. 9 and 10) formed in the housing 12' of the isolation element 10'. The diaphragm 14' comprises a shape that is complementary to each recess 22' to which the diaphragm 14' is to be attached. Specifically, the diaphragm 14' shown in FIGS. 11 through 13 comprises a circular shape. In other embodiments, the diaphragm 14' may have a shape that may be described as obround, an ellipse, an oval, a rectangle, or a rectangle with rounded corners.

In some embodiments, the diaphragm 14' may comprise a corrugated member. As best shown in FIG. 13, the diaphragm 14' may comprise a series of alternating ridges and grooves that enable the diaphragm 14' to comply, expand, and compress in response to an applied pressure and/or temperature.

Like the housing 12' to which it is to be attached, the diaphragm 14' may comprise a material that is rugged and corrosion-resistant, such as any of the materials discussed previously in connection with the embodiment shown in FIGS. 5 and 6.

Referring back to FIG. 8, the diaphragms 14' may be attached to the housing 12' at the perimeter of the recesses 22' (FIGS. 9 and 10) formed in the housing 12' using, for example, any of the methods discussed previously in relation to the embodiment shown in FIG. 1.

Figure 14:
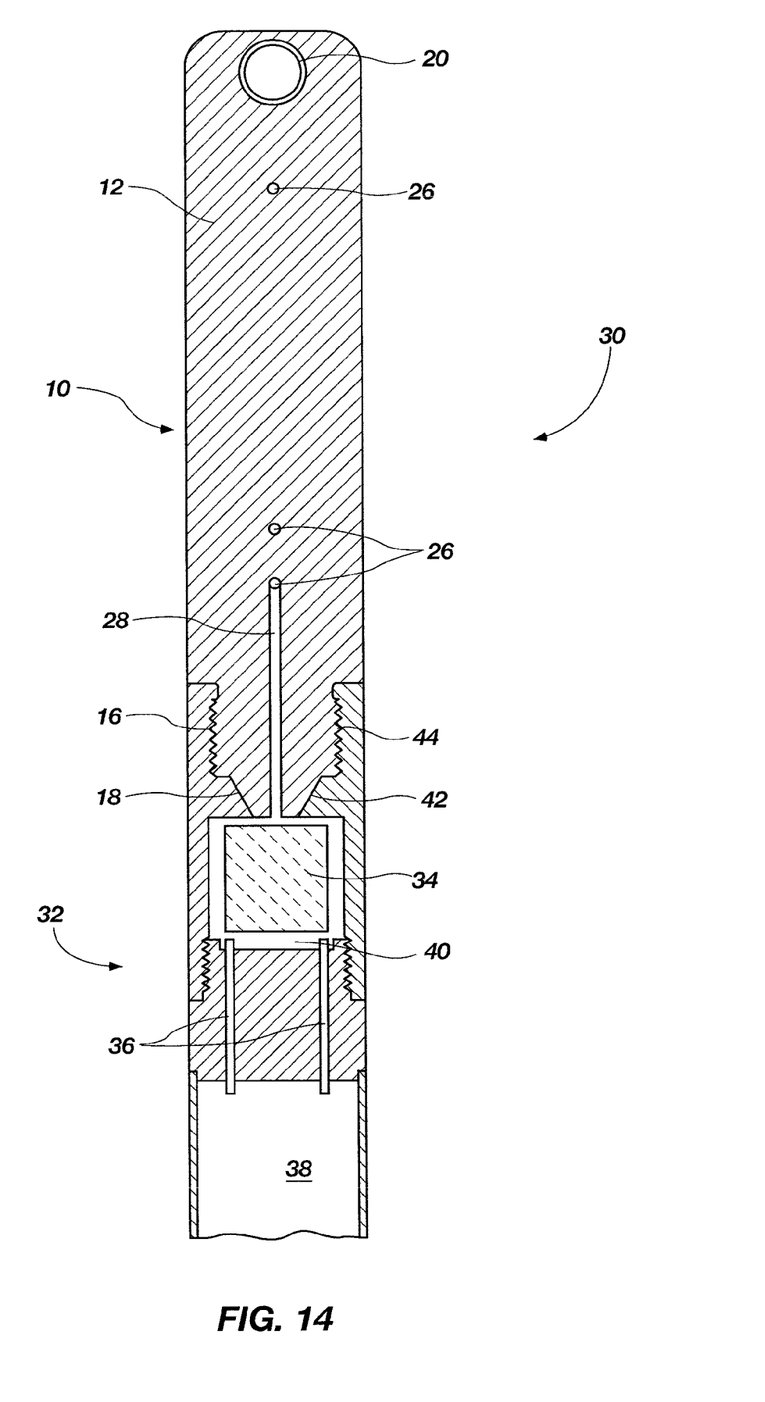
FIG. 14 is a cross-sectional view of a sensor assembly including an isolation element according to an embodiment of the present disclosure.

FIG. 14 is a cross-sectional view of a sensor assembly 30 (e.g., a pressure sensor assembly) according to an embodiment of the present disclosure. The sensor assembly 30 includes an isolation element 10, for example, the isolation element 10 shown in FIG. 1. The sensor assembly 30 further includes a sensor housing 32. The sensor housing 32 includes a sensor 34, such as, for example, a quartz crystal sensing element. Conductors 36 transmit electrical signals from the sensor 34 to and from transducer electronics (not shown) in an electronics chamber 38. The sensor 34 is disposed in a sensor chamber 40. At an end of the sensor chamber 40 opposing the conductors 36, a frustoconical bore 42 provides access to the sensor chamber 40. A threaded connection bore 44 is further provided for attaching the isolation element 10 to the sensor housing 32.

The isolation element 10 may be assembled with the sensor housing 32 by engaging the threaded connection portion 16 of the isolation element 10 with the threaded connection bore 44 of the sensor housing 32. As the isolation element 10 is rotated, threads of the threaded connection portion 16 engage grooves of the threaded connection bore 44 to form a connection. Accordingly, the isolation element 10 may be removable, enabling replacement of the isolation element 10, and both cleaning and servicing of the isolation element 10, the sensor housing 32, and the sensor 34. In other embodiments, the isolation element 10 may be permanently attached to the sensor housing 32. Furthermore, in some embodiments, the isolation element 10 may be attached to the sensor housing 32 using, for example, a threaded connection, a weld, a metal crush seal, an O-ring seal, a slip fit, a press fit, or any combination of these. In some applications, such as an environment subjecting the isolation element 10 to high vibrations, a threaded member, such as a screw or bolt, may threadedly engage a threaded securing hole 20 formed in an end of the isolation element 10 opposing the threaded connection portion 16 and engage a threaded hole in some other apparatus (e.g., a portion of a drill string used in earth-boring applications) to prevent vibrations from rotating (e.g., unthreading) the isolation element 10 and exposing the sensor 34 to the working environment.

In some embodiments, the sealing element 18 of the isolation element 10 may have a frustoconical shape complementary to the frustoconical bore 42 of the sensor housing 32. The sealing element 18 may abut against the frustoconical bore 42 to form a seal therebetween. For example, the seal may be a metal-to-metal seal. In environments where an isolating element may be used, such as in an earth-boring application, high temperatures, high pressures, corrosive environment, abrasive environment, or combinations thereof may render alternative methods of forming a seal, such as a bushing or O-ring, ineffective due to degradation and eventual failure of the seal. The metal-to-metal cone seal may enable a longer effective working life of the seal isolating the sensor 34 from the working environment. Accordingly, seals formed between the diaphragms 14 and the housing 12 and between the sealing element 18 and the frustoconical bore 42 may provide a hermetic seal to isolate the sensor 34 from the working environment. For example, the assembled sensor assembly 30 may have a hermetic leak rate of less than ten to the negative ninth power cubic centimeters per second ($10^{-9}$ cc/sec) measured using helium at one atmosphere (1 atm.) of pressure.

The longitudinal bore 28 of the isolation element 10 may be in communication with the sensor chamber 40 and at least one hole 26 formed through the backing plate 24 of at least one recess 22. For example, a highly incompressible, low thermal expansion fluid may be provided in the sealed portions of the sensor assembly 30, including the recesses 22, the holes 26, the longitudinal bore 28 of the isolation element 10, and the sensor chamber 40. The fluid may comprise, for example, oil such as a PARATHERM® or sebacate oil.

As pressure is applied by the working environment to the isolation element 10, the diaphragms 14 may comply, expand, or compress into the recesses 22 formed in the longitudinally extending sides 13, 15 (FIGS. 3) of the housing 12 of the isolation element 10. The pressure may then be transmitted by the highly incompressible, low thermal expansion fluid through the holes 26 and the longitudinal bore 28 to the sensor 34 in the sensor chamber 40. The recesses 22 may be of a depth that, when the diaphragms 14 are subjected to pressures that put the diaphragms 14 at maximum displacement or compression, the diaphragms 14 abut against the backing plates 24 of the recesses 22.

Referring to back FIGS. 1 and 3, the diaphragms 14 may be coupled to the housing 12 of the isolation element 10 proximate to the recesses 22 such the diaphragms 14 may by displaced (e.g., by a pressure and/or temperature applied thereto) into the recesses 22. For example, the configuration of the isolation element 10 may enable the diaphragms 14 to exhibit a primary direction of displacement (i.e., a direction along which the diaphragms 14 may exhibit the largest amount of displacement as compared to other directions) that is substantially transverse to the longitudinal axis L of the housing 12. In some embodiments, the diaphragms 14 may exhibit a primary direction of displacement that is transverse to the longitudinal bore 28, which is in communication with an adjacent structure (e.g., the sensor housing 32 (FIG. 14)).

Locating the diaphragms 14 and recesses 22 in the longitudinally extending sides 13, 15 of the housing 12 may enable more volumetric displacement of the highly incompressible, low thermal expansion fluid when compared to a diaphragm or bellows located on an end of the housing 12 transverse to the longitudinal axis L of the isolation element 10. Accordingly, locating the diaphragms 14 and recesses 22 in the longitudinally extending sides 13, 15 of the housing 12 may be particularly beneficial in a downhole earth-boring environment, which has limited radial space but may require a relatively large volume of oil to expand or contract in response to changes in downhole temperature and pressure. Moreover, locating the diaphragms 14 in the longitudinally extending sides 13, 15 of the housing 12 may prevent debris, detritus, and contaminants, which may be present in the working environment from interfering with the operation of the sensor assembly 30. For example, debris and detritus may be less likely to become lodged in the alternating ridges and grooves of the corrugated diaphragms 14 when compared with a bellows configuration. In summary, locating the diaphragms 14 and recesses 22 in the longitudinally extending sides 13, 15 of the housing 12 may enable more accurate and complete measurement of pressure and/or temperature in a working environment.

While embodiments of the present disclosure may be susceptible to various modifications and alternative forms, specific embodiments have been shown by way of example in the drawings and have been described in detail herein. However, it should be understood that the disclosure is not intended to be limited to the particular forms disclosed. Rather, the disclosure encompasses all modifications, variations, combinations, and alternatives falling within the scope of the disclosure as defined by the following appended claims and their legal equivalents.

What is claimed is:

1. An isolation element, comprising:
   a housing comprising a longitudinal bore formed therein and at least one recess formed in at least one longitudinally extending side of the housing, the at least one recess extending from an exterior surface of the at least one longitudinally extending side of the housing into the housing in a direction transverse to the longitudinal bore, wherein the at least one recess is in communication with the longitudinal bore; and
   at least one diaphragm attached to the housing along a periphery of the at least one recess and sealing the at least one recess and the longitudinal bore from an environment exterior to the housing.

2. The isolation element of claim 1, wherein the at least one recess comprises a plurality of recesses and the at least one diaphragm comprises a plurality of diaphragms and wherein each diaphragm of the plurality of diaphragms seals an associated recess of the plurality of recesses from the exterior environment.

3. The isolation element of claim 2, wherein at least one recess of the plurality of recesses is formed in a first longitudinally extending side of the housing and at least another recess of the plurality of recesses is formed in a second longitudinally extending side of the housing and wherein the first longitudinally extending side and second longitudinally extending side of the housing extend in a direction substantially parallel to the longitudinal bore.

4. The isolation element of claim 3, wherein the second longitudinally extending side opposes the first longitudinally extending side.

5. The isolation element of claim 2, wherein each longitudinally extending side of the housing includes at least two recesses of the plurality of recesses formed therein.

6. The isolation element of claim 1, wherein the at least one recess is formed in one longitudinally extending side of the housing.

7. The isolation element of claim 1, wherein the at least one diaphragm comprises a shape comprising one of a circle, an ellipse, an oval, a rectangle, a rectangle having rounded corners, and a rectangle having semicircles at opposing ends thereof and the at least one recess comprises a shape complementary to the shape of the at least one diaphragm.

8. The isolation element of claim 1, wherein the at least one diaphragm is corrugated.

9. The isolation element of claim 1, wherein the at least one diaphragm conforms to a backing plate forming a portion of the at least one recess in the housing when the at least one diaphragm is at a maximum displacement.

10. The isolation element of claim 1, wherein the at least one diaphragm is welded to the housing at a perimeter of the at least one recess.

11. The isolation element of claim 1, wherein the housing further comprises a threaded connection portion at an end thereof.

12. The isolation element of claim 1, wherein the housing comprises a recessed shelf proximate a periphery of the at least one recess, the at least one diaphragm being welded to the housing at the recessed shelf.

13. A sensor assembly, comprising:
an isolation element comprising:
  a housing comprising:
    a connection portion;
    a longitudinal bore formed within the housing and extending through the connection portion, the longitudinal bore extending at least substantially parallel to a longitudinal axis of the housing;
    a first longitudinally extending exterior side and a second, opposing longitudinally extending exterior side extending at least substantially parallel to the longitudinal axis of the housing;
    at least one recess formed in each of the first longitudinally extending exterior side and the second, opposing longitudinally extending exterior side of the housing, each recess extending into a respective longitudinally extending exterior side in a direction transverse to the longitudinal axis of the housing, wherein each recess is in communication with the longitudinal bore; and
  diaphragm coupled to the housing at a periphery of each recess, wherein each diaphragm extends over a respective recess and seals the respective recess at the first longitudinally extending exterior side or the second, opposing longitudinally extending exterior side of the housing; and
  a sensor housing attached to the isolation element at the connection portion, the sensor housing comprising a sensor chamber disposed within and defined by the sensor housing, the sensor chamber being in communication with the longitudinal bore of the isolation element, and at least one sensor disposed within the sensor chamber.

14. The sensor assembly of claim 13, wherein at least one of the first longitudinally extending exterior side and the second, opposing longitudinally extending exterior side comprises a plurality of recesses.

15. The sensor assembly of claim 13, wherein the connection portion of the isolation element comprises a threaded connection portion.

16. The sensor assembly of claim 15, wherein the isolation element further comprises a frustoconical member adjacent the threaded connection portion, the frustoconical member forming a seal between the isolation element and the sensor housing.

17. The sensor assembly of claim 15, wherein the at least one diaphragm is positioned over the at least one recess to enable the at least one diaphragm to displace into the at least one recess in a direction substantially transverse to the longitudinal bore formed in the housing.

18. A method of forming an isolation element for use with a sensor, comprising:
  forming a longitudinal bore in a housing of an isolation element;
  forming at least one recess to extend, in a direction transverse to the longitudinal bore, from an exterior surface of at least one longitudinally extending side of the housing into the housing and to the longitudinal bore;
  coupling at least one diaphragm to the housing at a perimeter of the at least one recess; and
  positioning the at least one diaphragm such that a primary direction of displacement of the at least one diaphragm extends into the at least one recess.

19. The method of claim 18, wherein positioning the at least one diaphragm comprises positioning the at least one diaphragm such that the primary direction of displacement of the at least one diaphragm extends is at least substantially transverse to the longitudinal bore formed in the housing.

20. The method of claim 18, wherein coupling at least one diaphragm to the housing at a perimeter of the at least one recess comprises welding the at least one diaphragm to a support member at the perimeter of the at least one recess.

21. The method of claim 18, further comprising attaching the isolation element to a sensor housing and forming a seal between the isolation element and the sensor housing.

* * * * *

UNITED STATES PATENT AND TRADEMARK OFFICE
CERTIFICATE OF CORRECTION

| | | |
|---|---|---|
| PATENT NO. | : 8,333,117 B2 | Page 1 of 1 |
| APPLICATION NO. | : 13/023339 | |
| DATED | : December 18, 2012 | |
| INVENTOR(S) | : Scott J. Brown et al. | |

It is certified that error appears in the above-identified patent and that said Letters Patent is hereby corrected as shown below:

In the claims:

CLAIM 13, COLUMN 11, LINE 39,  insert --a-- prior to --diaphragm coupled to the housing at the periphery of--

Signed and Sealed this
Twenty-first Day of April, 2015

Michelle K. Lee
*Director of the United States Patent and Trademark Office*